(12) United States Patent
Tanimura et al.

(10) Patent No.: US 8,248,497 B2
(45) Date of Patent: Aug. 21, 2012

(54) IMAGE SENSOR DEVICE WITH MOVABLE SENSOR

(75) Inventors: Yasutaka Tanimura, Nara (JP); Akira Kosaka, Yao (JP); Natsuki Yamamoto, Amagasaki (JP); Masataka Hamada, Osakasayama (JP); Yoshihiro Hara, Takatsuki (JP)

(73) Assignee: Konica Minolta Opto, Inc., Tokyo (JP)

( * ) Notice: Subject to any disclaimer, the term of this patent is extended or adjusted under 35 U.S.C. 154(b) by 618 days.

(21) Appl. No.: 12/031,981

(22) Filed: Feb. 15, 2008

(65) Prior Publication Data

US 2008/0198249 A1 Aug. 21, 2008

(30) Foreign Application Priority Data

Feb. 19, 2007 (JP) ................................ 2007-037615

(51) Int. Cl.
*H04N 5/335* (2011.01)
*H04N 5/228* (2006.01)

(52) U.S. Cl. .................. 348/294; 348/208.4; 348/208.7; 348/208.99

(58) Field of Classification Search .................. 348/294, 348/208.4, 208.7, 208.99, 208.11
See application file for complete search history.

(56) References Cited

U.S. PATENT DOCUMENTS

| 4,392,154 A * | 7/1983 | Horii .............................. 348/282 |
| 6,937,462 B2 * | 8/2005 | Kamiya ......................... 361/752 |
| 2005/0158058 A1 * | 7/2005 | Bae et al. ...................... 398/182 |
| 2006/0092514 A1 * | 5/2006 | Koo et al. ..................... 359/557 |
| 2007/0024715 A1 * | 2/2007 | Hirasawa et al. ........... 348/208.7 |

FOREIGN PATENT DOCUMENTS

JP 2006-133730 A 5/2006

* cited by examiner

*Primary Examiner* — Jason Chan
*Assistant Examiner* — Joel Fosselman
(74) *Attorney, Agent, or Firm* — Cozen O'Connor (57) ABSTRACT

An object of the present invention is to provide a small-sized image sensor device having high precision of moving an object to be moved. The image sensor device includes: a fixed unit; a movable unit including an image sensor; a beam unit fixed to the fixed unit and movably supporting the movable unit; a driving unit for applying a driving force for moving the movable unit; and a wire unit provided for the beam unit and electrically connecting the image sensor and an external circuit.

21 Claims, 8 Drawing Sheets

IMAGE SENSOR DEVICE WITH MOVABLE SENSOR

This application claims priority on application No. 2007-037615 filed in Japan, the contents of which are hereby incorporated by reference.

BACKGROUND OF THE INVENTION

1. Field of the Invention

The present invention relates to an image sensor device.

2. Description of the Background Art

In recent years, a camera having a function of correcting image blurring which occurs in a captured image due to a shake of a hand holding the camera or the like (so-called camera-shake correcting function) is being widely spread. Particularly, in a light-weight image capturing device such as a small-sized digital camera or a cellular phone with an image capturing function, a handshake occurs easily. It is therefore demanded to provide the device with the handshake correcting function.

To realize the camera shake correcting function, however, a driving mechanism for driving various members such as an image pickup device is necessary. It hinders realization of a smaller, lighter image capturing device.

To solve such a problem, an apparatus for correcting camera shake of a camera lens assembly is provided. The apparatus includes a fixed substrate, a movable substrate movably disposed on the fixed substrate, a fixed comb structure fixed on the fixed substrate and disposed over the movable substrate, and a movable comb structure disposed on the movable substrate and constructed so as to be movable together with the movable substrate over the fixed substrate. By applying an electromotive force to the fixed comb structure and the movable comb structure, the movable substrate is moved by an attracting force acting between the fixed comb structure and the movable comb structure (refer to, for example, Japanese Patent Application Laid-Open No. 2006-133730).

However, in the technique proposed in Japanese Patent Application Laid-Open No. 2006-133730, various signals from an image sensor provided over the movable substrate are output to an external device via a so-called flexible substrate (FPC: Flexible Printed Circuits). Consequently, at the time of driving the movable substrate, a reaction force according to a force required to deform the flexible substrate acts on the movable substrate, and it becomes a factor of disturbing fine driving of the movable substrate. That is, movement precision of an object to be moved deteriorates.

SUMMARY OF THE INVENTION

The present invention is directed to an image sensor device.

According to the invention, the image sensor device includes: a fixed unit; a movable unit including an image sensor; a beam unit fixed to the fixed unit and movably supporting the movable unit; a driving unit for applying a driving force for moving the movable unit; and a wire unit provided for the beam unit and electrically connecting the image sensor and an external circuit.

By providing a wire for the beam unit for supporting the movable unit without providing a special structure of installing a wire for electrically connecting the image sensor and an external circuit, when the movable unit moves relative to the fixed unit, resistance to movement of the movable unit from a structure other than the beam unit is suppressed. Thus, the small-sized sensor device with high precision of movement of an object to be moved can be provided.

According to another aspect of the present invention, the image sensor device includes: a fixed unit; a movable unit including an image sensor; a beam unit fixed to the fixed unit and movably supporting the movable unit; and a driving unit for applying a driving force for moving the movable unit. The beam unit has a function of transmitting a signal between the image sensor and an external circuit.

When the movable unit moves relative to the fixed unit, resistance to movement of the movable unit from a structure other than the beam unit is suppressed. Thus, the small-sized image sensor device with high precision of movement of an object to be moved can be provided.

Therefore, an object of the present invention is to provide a small-size image sensor device with high precision of movement of an object to be moved.

These and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described hereinbelow with reference to the drawings.

Image Capturing Apparatus

Figure 1:
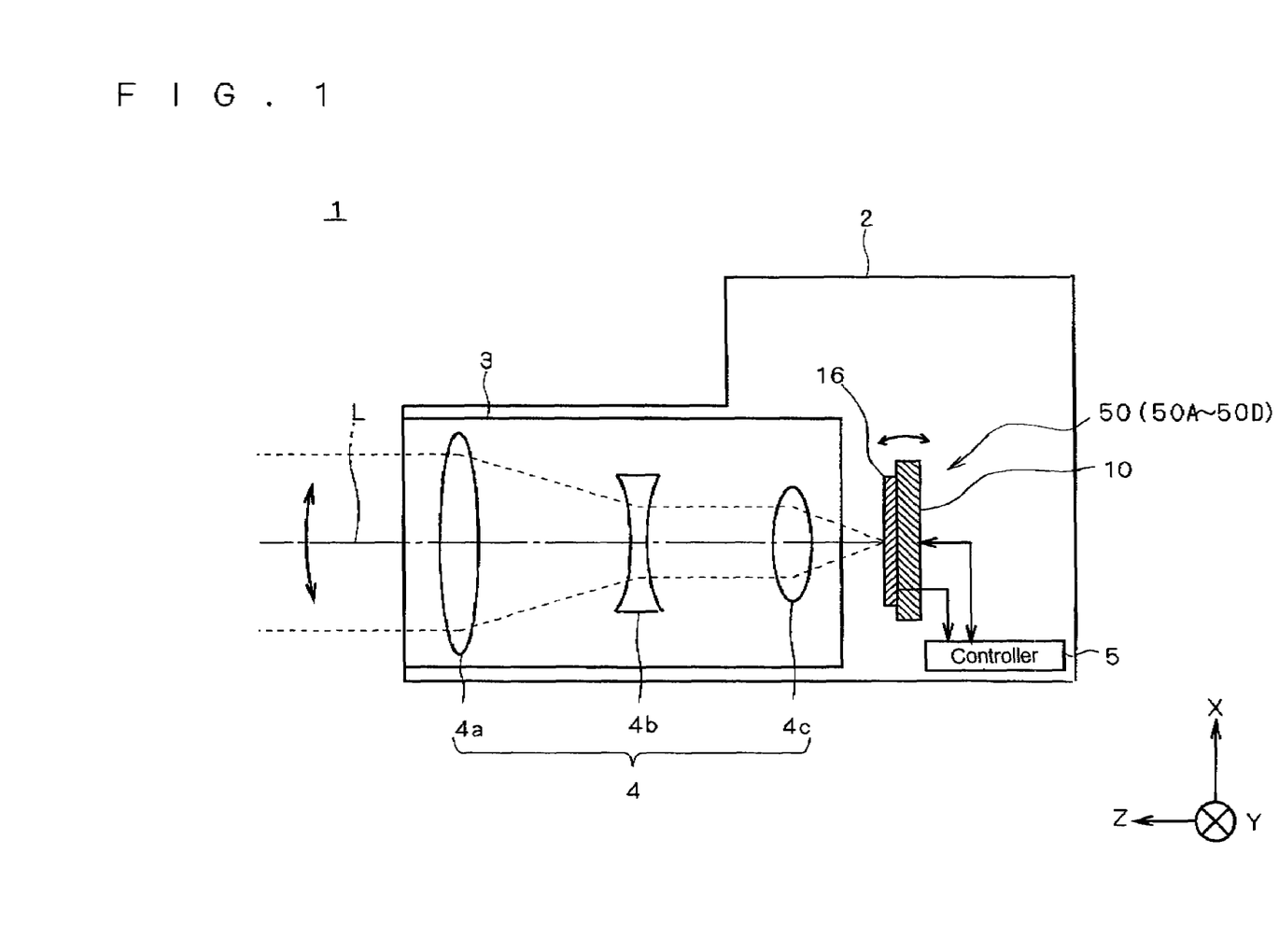
FIG. 1 is a cross section view showing a schematic configuration of an image capturing apparatus as an embodiment of the present invention.

FIG. 1 is a cross section view schematically showing the configuration of an image capturing apparatus 1 as an embodiment of the present invention. In FIG. 1 and subsequent drawings, three axes of X, Y, and Z orthogonal to each other are shown to clarify the azimuth relations.

The image capturing apparatus 1 is a digital camera having a so-called camera shake correcting function and including, mainly, a body (camera body) 2 of the image capturing apparatus and a camera cone 3 as an optical system including a lens group 4.

The lens group 4 has a plurality of lenses 4a, 4b, and 4c and can adjust the magnification and a focal point by properly changing the distance between the lenses.

The camera body 2 has a sensor device 50 having a driving mechanism 10 and an image pickup device 16, and a controller 5 which controls the entire image capturing apparatus 1 in a centralized manner.

The image pickup device 16 is constructed by a so-called image pickup sensor chip. The image pickup device 16 receives a light image of a subject (subject image) entering along an optical axis L of the camera cone 3 by a front plane (light reception plane) directed toward the +Z side, photo-electric-converts the light image to a pixel signal on the pixel unit basis, and outputs the pixel signal to the controller 5.

The controller 5 is constructed by a circuit including a CPU, a memory, and a ROM. For example, by executing a program stored in the ROM by the CPU, various controls and functions are realized.

The driving mechanism 10 is fixed to the camera body 2 and drives on the basis of a control signal from the controller 5, thereby properly changing the posture of the image pickup device 16 with respect to the camera body 2.

A control signal for driving the driving mechanism 10 is a signal corresponding to a control amount obtained by detecting a direction and amount of a shake of the image capturing apparatus 1 caused by a handshake of the user holding the image capturing apparatus 1 by using a sensor (not shown) such as a gyro and performing computation based on the direction and amount of the shake.

When the posture of the image capturing apparatus 1 moves at the time of photographing, the image capture range shifts, and the relative angle between a main subject and the image capturing apparatus 1 changes. If nothing is done, a subject image received by the image pickup device 16 during exposure time for capturing an image to be stored of one frame blurs, so that the subject blurs on the captured image.

In the image capturing apparatus 1, by the handshake correcting function, the driving mechanism 10 changes the posture of the image pickup device 16 in correspondence with the movement of the posture of the image capturing apparatus 1, thereby controlling the subject image to be received by the image pickup device 16 to be constant as much as possible at the time of photographing. By the handshake correction, correction of blur of a captured image, that is, an image blur correction is realized.

Configuration of Sensor Device

Figure 2A:
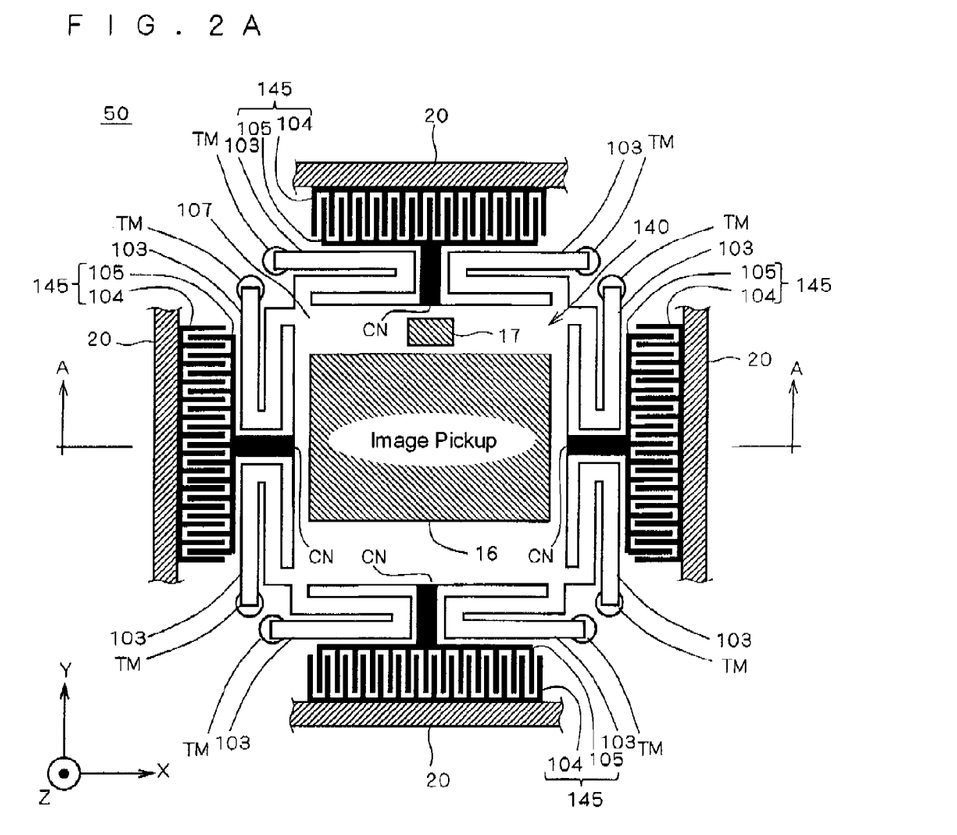
FIGS. 2A and 2B are schematic views showing the configuration of a sensor device in the embodiment of the invention.
Figure 2B:
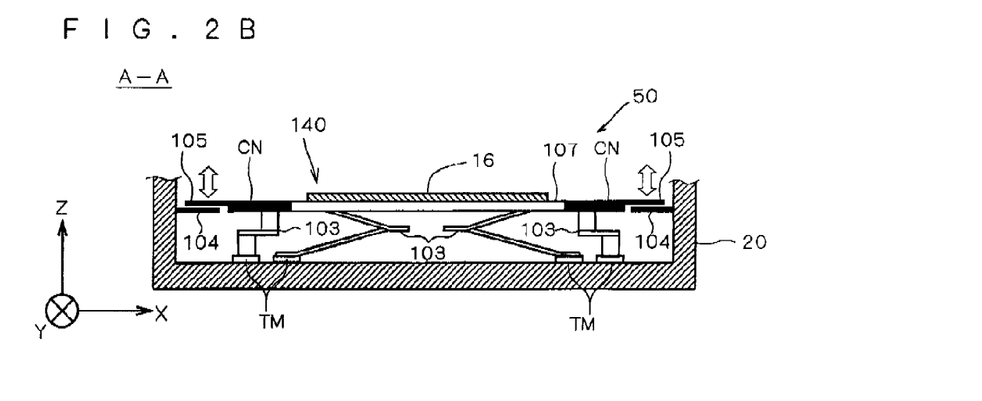

FIGS. 2A and 2B are drawings schematically showing main components of the sensor device 50 in the embodiment of the invention. FIG. 2A is a front view of the main components of the sensor device 50 seen from the front side (+Z direction) of the image pickup device 16. FIG. 2B is a schematic cross section view taken along line A-A of FIG. 2A.

An actuate mechanism (driving mechanism 10) as a main component of the sensor device 50 is constructed by a complicated pattern. The pattern is formed by the micromachining technique as a method used for integrating a fine device. The technique is called MEMS (Micro Electro Mechanical Systems) as a kind of the semiconductor processing technique.

The MEMS denotes a technique of manufacturing a micro sensor, an actuator, and an electromechanical structure in the unit of μm by using the micromachining technique as an application of a semiconductor process, particularly, the integrated circuit technique. A fine mechanical structure manufactured by the micromachining technique is embodied with size of mm or less and precision of μm or less.

The micromachining technique has advantages that miniaturization of a product, higher performance, multiple functions, and integration are realized by ultra-precision microfabrication and safety and reliability are improved. Since an integrated system can be embodied, necessity of an assembly process of assembling separate members is reduced. Therefore, manufacture by a batch process can be performed, and mass production at low cost can be realized.

Although the MEMS is used as a scheme for manufacturing the sensor device 50 of the embodiment of the invention, the configuration is not directly related to the structure of the sensor device 50. Consequently, the detailed description of the process of manufacturing the sensor device 50 using the MEMS will not be given.

The configuration of the sensor device 50 will be described hereinbelow with reference to FIGS. 2A and 2B.

The sensor device 50 has mainly a fixed unit 20, a movable unit 140, an electrostatic actuator 145, a beam structure 103, and a support member TM.

Although not shown, the fixed unit 20 is fixed to the camera body 2.

The movable unit 140 includes a movable substrate 107 having an almost-rectangular-shaped surface, and the image pickup device 16 and a position sensor 17 provided on the movable substrate 107. The movable unit 140 is supported by total eight beam structures 103 provided near both ends of sides of the movable substrate 107 in a state where it is apart from the fixed unit 20 to some extent in the +Z direction.

The beam structure 103 has a thin-band-shaped and zigzag structure made of, for example, silicon (Si) as a main material. One end of the beam structure 103 is fixed to the movable substrate 107 and the other end is fixed to the support member TM on the fixed unit 20.

The electrostatic actuator 145 has a part (fixed comb structure) 104 having a comb structure fixed to the fixed unit 20 and a part (movable comb structure) 105 having a comb structure coupled to the movable unit 140 via a coupling part CN. More specifically, one end of the coupling part CN is fixed to a position near the center of a side in the movable substrate 107, and the other end of the coupling part CN is fixed to the movable comb structure 105.

Each of projections constructing the comb structure of the fixed comb structure 104 and the movable comb structure 105 has, for example, dimensions of a few μm in thickness and width. The interval between the projections also has a dimension of about a few μm. The fixed comb structure 104 and the movable comb structure 105 are disposed so that the projections constructing the comb structure of the movable comb structure 105 enter the spaces between the projections constructing the comb structure of the fixed comb structure 104. The state where the projections of the fixed comb structure 104 and the projections of the movable comb structure 105 are apart from each other only by predetermined distance is set as the initial state.

In the electrostatic actuator 145, electrostatic forces repelling each other are generated between the fixed comb structure 104 and the movable comb structure 105. Consequently, the movable unit 140 is supported by not only the beam structure 103 but also the electrostatic forces.

In the initial state, the comb structure of the movable comb structure 105 is disposed so as to be slightly shifted in the +Z direction from the fixed comb structure 104.

The beam structure 103 is made of a relatively soft material (Si) and has a thin band-shaped structure, so that it has flexibility.

Therefore, by changing repulsive forces acting on each other between the fixed comb structure 104 and the movable comb structure 105 in the electrostatic actuator 145, the driving force is applied to the movable unit 140, and the beam structure 103 is properly elastically deformed. At this time, the movable comb structure 105 moves relative to the fixed comb structure 104 in a Z-axis direction.

Concretely, for example, when the repulsion forces between the fixed comb structure 104 and the movable comb structure 105 increase in the two electrostatic actuators 145 fixed to the opposite sides of the movable substrate 107, the movable unit 140 is moved relative to the fixed unit 20 so as to be pushed in the +Z direction. When the repulsion forces between the fixed comb structure 104 and the movable comb structure 105 are weakened, by the elastic force of the beam structure 103, the movable unit 140 moves relative to the fixed unit 20 toward the initial position along a −Z direction.

When the forces applied to the movable unit 140 by the two electrostatic actuators 145 fixed to the opposite sides of the movable substrate 107 become unbalanced, the angle between the movable unit 140 and the fixed unit 20 is changed. By such movement, the angle between the image pickup device 16 and the optical axis L is changed.

As a result of the relative movement of the movable comb structure 105 to the fixed comb structure 104, the movable unit 140 is moved relative to the fixed unit 20, and the posture of the image pickup device 16 is properly changed. The driving of the electrostatic actuator 145 is properly controlled on the basis of the control signal from the controller 5.

The movable substrate 107, the beam structure 103, the fixed comb structure 104, and the movable comb structure 105 are formed at the same time by the technique called MEMS (MEMS technique).

Concretely, by performing an etching process according to the MEMS technique on a matter stacked on the fixed substrate as a component of the fixed unit 20, the movable substrate 107, the beam structure 103, the fixed comb structure 104, and the movable comb structure 105 are formed at the same time by the same process.

The fixed substrate as a component of the fixed unit 20 for applying the MEMS technique is manufactured by using a glass substrate. The stacked matters for forming the movable substrate 107, the beam structure 103, the fixed comb structure 104, and the movable comb structure 105 are generated by layers made of a predetermined material such as silicon (Si).

The image pickup device 16, the position sensor 17, and the like are often made of a semiconductor material such as Si as a main material. In this case, at least a part of the beam structure 103 is made of the same material as the main material of the image pickup device 16 and the position sensor 17.

In such a case, various sensors such as the image pickup device 16 and the position sensor 17 can be generated at the same time by the same process as that of the beam structure 103 by the MEMS technique. Thus, efficient production is realized. In other words, the beam structure 103 can be formed in the same process as that of the various sensors such as the image pickup device 16 and the position sensor 17, so that formation of the beam structure 103 is facilitated.

The image pickup device 16 disposed on the movable substrate 107 is directly adhered to the movable substrate 107. The direct adhesion denotes an adhering method using no adhesive. For example, it is an adhering method using attracting forces between the surfaces of materials of the same kind. The direct adhesion is very excellent in terms of assurance of strength after adhesion, reduction in distortion after adhesion, simplicity in adhesion, realization of smaller space, and the like.

In the embodiment, the main materials of both of the movable substrate 107 and the image pickup device 16 are silicon (Si). Consequently, by utilizing the direct adhesion, the advantages are obtained.

In the embodiment, the movable substrate 107 and the image pickup device 16 are adhered to each other by using the direct adhesion. The invention, however, is not limited to the embodiment but the movable comb structure 105 may be directly formed on the rear side (the face opposite to the light reception face) of the image pickup device 16 without providing the movable substrate 107. The process of forming a number of pixels having the photoelectric conversion function on the image pickup device 16 and the process of forming the movable comb structure 105 are basically the same semiconductor manufacturing process. Consequently, there is no special difficulty to perform a process such as deposition of a layer of Si on both sides of the image pickup device 16.

As described above, in the case of employing the configuration of providing both sides of the image pickup device 16 with the two functions of the light reception face and the movable comb structure 105, adhesion itself of the movable substrate 107 and the image pickup device 16 becomes unnecessary. Therefore, various advantages such as assurance of strength, reduction in distortion, realization of smaller space, and the like are obtained more than the case of direct adhesion.

On the image pickup device 16 or the fixed substrate of the fixed unit 20, not only the parts related to the actuate mechanism such as the movable comb structure 105 but also functions which can be formed by the semiconductor manufacturing process such as various sensors including the position sensor 17 for detecting the position of the movable substrate 107 relative to the fixed substrate of the fixed unit 20 and the gyro sensor for detecting a shake in the image capturing apparatus 1 can be integrally constructed.

Although not shown in FIGS. 2A and 2B, wires for transmitting/receiving various signals between the image pickup device 16 and the position sensor 17 and the controller 5 are disposed along an extension direction of the beam structure 103 on the beam structure 103. The wires provided on the beam structure 103 can be formed simultaneously with the electrostatic actuator 145 by using the semiconductor manufacturing process. The wiring pattern will be described later.

As an example of the process of forming the wires on the beam structure 103, a conductive layer (Al, Cu, poly-Si, or the like) is stacked on the surface of a silicon (Si) layer and is selectively etched, thereby forming wires.

Since the movable substrate 107, the beam structure 103, the wires 110, and the fixed substrate constructing the fixed unit 20 can be formed by similar processes as described above, they are integrally manufactured. It is unnecessary to mechanically connect the components.

As described above, it is preferable to integrally form the movable substrate 107, the beam structure 103, the wires 110, and the fixed substrate constructing the fixed unit 20 for the following reason. At the time of moving the movable unit 140 relative to the fixed unit 20, occurrence of stress concentration accompanying deformation of the beam structure 103 is suppressed in a part where the beam structure 103 and the movable substrate 107 are connected to each other, a part where the beam structure 103 and the support member TM are connected to each other, and the like.

Although not shown in FIGS. 2A and 2B, in the sensor device 50, the guard glass is provided on the front side of the image pickup device 16 (the side in the +Z direction) and a sealed state is held. In place of the guard glass, the sealed state may be held by a lens closest to the image pickup device 16, included in the lens group 4.

Shape of Beam Structure and Wire Path

Figure 3A:
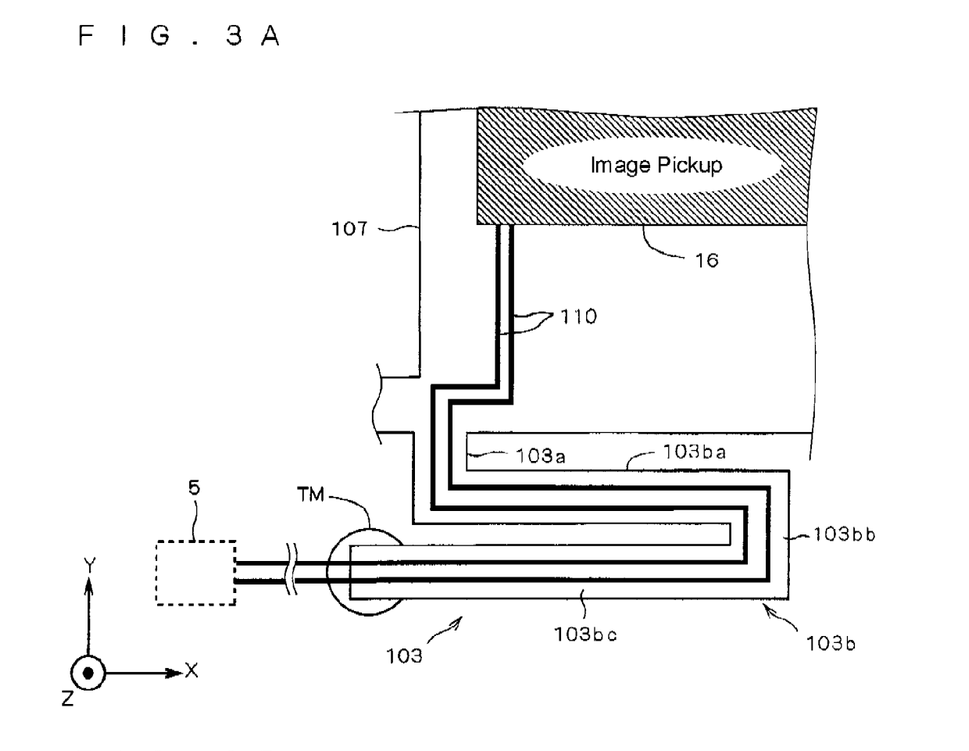
FIGS. 3A and 3B are schematic views showing the structure of a beam unit and a wiring pattern.
Figure 3B:
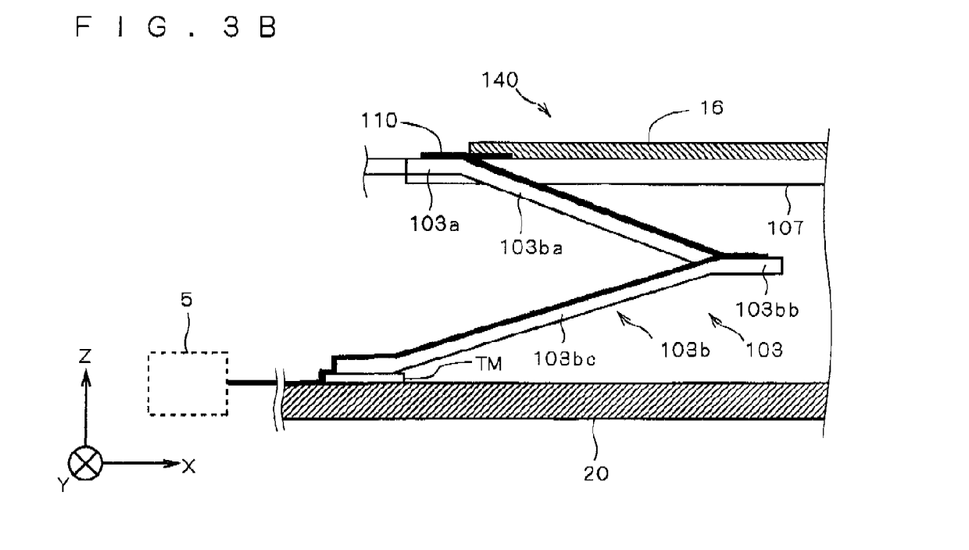

FIGS. 3A and 3B are drawings schematically showing the shape of the beam structure 103 and the pattern of the wires. In FIGS. 3A and 3B, attention is paid to one of the eight beam structures 103, and the shape of the beam structure 103 and the pattern of the wires installed on the beam structure 103 are illustrated. FIG. 3A is a front view seen from the front side (+Z direction) of the image pickup device 16, and FIG. 3B is a side view of the image pickup device 16 seen from the −Y side to the +Y side.

First, the shape of the beam structure 103 will be described.

As shown in FIG. 3A, when viewed from the front side (the +Z direction in the drawing), the beam structure 103 has a part (projected part) 103a projected from a portion near an end of one side of the movable substrate 107 to the side of the movable substrate 107 (a −Y direction in the drawing) and a U-shaped part 103b extending from the projected part 103a to the support part TM.

The U-shaped part 103b has first and second long side parts 103ba and 103bc at both ends and a coupling part 103bb coupling the first and second long side parts 103ba and 103bc. That is, the beam structure 103 is constructed by integrating, in order, the projected part 103a, the first long side part 103ba, the coupling part 103bb, and the second long side part 103bc.

As shown in FIG. 3B, the beam structure 103 is constructed in such a manner that, when viewed from the side (the −Y direction in the drawing), the first long side part 103ba extends from the left upper part to the right lower part in the drawing, and the second long side part 103bc extends from the right upper part to the left lower part. The beam structure 103 is made of a relatively soft material such as Si and is formed relatively thinly (in the Z-axis direction in the drawing), so that a spring structure having flexibility is formed.

That is, portions around the four corners of the movable unit 140 are supported by the surroundings which are the total eight beam structures 103, that is, each of the portions is supported by two beam structures 103. With a configuration, the movable unit 140 floats above the fixed part 20.

As described above, when loads are applied to the movable unit 140 from the electrostatic actuators 145 disposed at four sides of the movable unit 140, the beam structures 103 are properly deformed, and the movable unit 140 moves along a direction perpendicular to a predetermined face (in this case, the front face) of the image pickup device 16, the position sensor 17, or the like.

As shown in FIGS. 3A and 3B, the beam structure 103 is made of a soft material such as Si and extends in a band shape and in a zigzag manner. Consequently, the extension distance is, for example, a few times as long as the distance between the movable unit 140 and the fixed unit 20. FIGS. 3A and 3B show an example that the extension distance is at least three times as long as the distance between the movable unit 140 and the fixed unit 20.

Consequently, deformation of the beam structure 103 at the time of movement of the movable unit 140 relative to the fixed unit 20 does not locally concentrate and severe torsion or the like does not occur, so that the beam structure 103 has very excellent durability. Since the beam structure 103 is fine, a plurality of (eight in this case) beam structures 103 can be formed. From this aspect as well, the loads applied to the beam structures 103 are dispersed, and high durability can be realized.

Although the beam structure 103 has to have a width to some extent in order to support the movable unit 140, while dispersing deformation stress in long extension distance, the beam structure can be elastically deformed. There is consequently no problem.

Next, the wiring pattern will be described.

In FIGS. 3A and 3B, the wiring paths of wires 110 are shown by thick lines.

The wire 110 shown in FIGS. 3A and 3B is, for example, an electric circuit used for reading a pixel signal (image data signal) from the image pickup device 16 and electrically connects the controller 5 as an external circuit of the sensor device 50 and the image pickup device 16. That is, the image data signal is transmitted from the image pickup device 16 to the controller 5 via the wire 110.

As shown in FIGS. 3A and 3B, first, the wire 110 is led from the image pickup device 16 and installed on the movable substrate 107 toward the beam structure 103. Around the center in a width direction on the surface of the front side (the +Z direction side) of the beam structure 103, the wire 110 is installed along the extension direction of the beam structure 103 from the image pickup device 16 side of the beam structure 103 to the fixed unit 20 side via the support member TM. Further, the wire 110 is installed to the fixed unit 20 via the support member TM.

The wire 110 is installed from the fixed unit 20 to the controller 5 via various paths. Although not shown, for example, the wire 110 from the fixed unit 20 is electrically connected to a lead frame by a method such as wire bonding using soldering and is finally electrically connected to the controller 5.

Although it has been described with reference to FIGS. 3A and 3B that the wire 110 is used for reading the image data signal from the image pickup device 16, the invention is not limited to the case. For example, the wire 110 can be also used for transmitting/receiving various signals between other parts (such as the movable comb structure 105 and the position sensor 17) fixed to the movable substrate 107 and the controller 5, for supplying potential, and the like.

As described above, in the sensor device 50 of the embodiment of the invention, without providing a special structure for installing a wire for electrically connecting a sensor (such as the image pickup device 16 and the position sensor 17) and an external circuit (such as the controller 5), the wire 110 is installed on the beam structure 103 that supports the movable unit 140. With such a configuration, when the movable unit 140 moves relative to the fixed unit 20, resistance to the movement of the movable unit 140 from the structure (for example, the flexible substrate) other than the beam structure 103 is suppressed. Therefore, the small sensor device 50 with high movement precision of an object to be moved can be realized.

The image capturing apparatus 1 to which such a sensor device 50 is applied can realize both improvement in movement precision of an object to be moved and miniaturization of the image capturing apparatus.

In addition, since a load applied to each of the beam structures 103 supporting the movable unit 140 is small, durability of the sensor device 50 and the image capturing apparatus 1 improves.

Via the wires 110 installed on the beam structure 103 supporting the movable unit 140, a data signal is transmitted between a sensor (such as the image pickup device 16 and the position sensor 17) and an external circuit (such as the controller 5). By employing such a configuration, it becomes unnecessary to provide a special structure for transmitting a data signal. Consequently, the movement precision of an object to be moved can be assured.

Further, by installing the wires 110 in the beam structure 103, the number of wires can be easily increased while suppressing the resistance to the movement of the movable unit 140 from structures (for example, a flexible substrate) other than the beam structure 103.

By the etching process using the MEMS technique or the like, the beam structure 103 can be formed finely. Consequently, the force required to deform the beam structure 103 becomes smaller, and the resistance to the movable unit 140 which occurs in the case where a force is applied by the electrostatic actuator 145 to the movable unit 140 can be further decreased. As a result, the movement precision of an object to be moved is further increased.

In the beam structure 103, by properly changing the thickness of the beam structure 103, a part in which relatively small deformation occurs and a part in which relatively large deformation occurs can be generated.

Modifications

Although the embodiment of the present invention has been described above, the invention is not limited to the above description.

For example, in the foregoing embodiment, an example of the shape of the beam structure 103 has been described. For example, even when the shape is variously changed by changing the zigzag shape or the like, effects similar to those of the embodiment can be obtained.

Figure 4A:
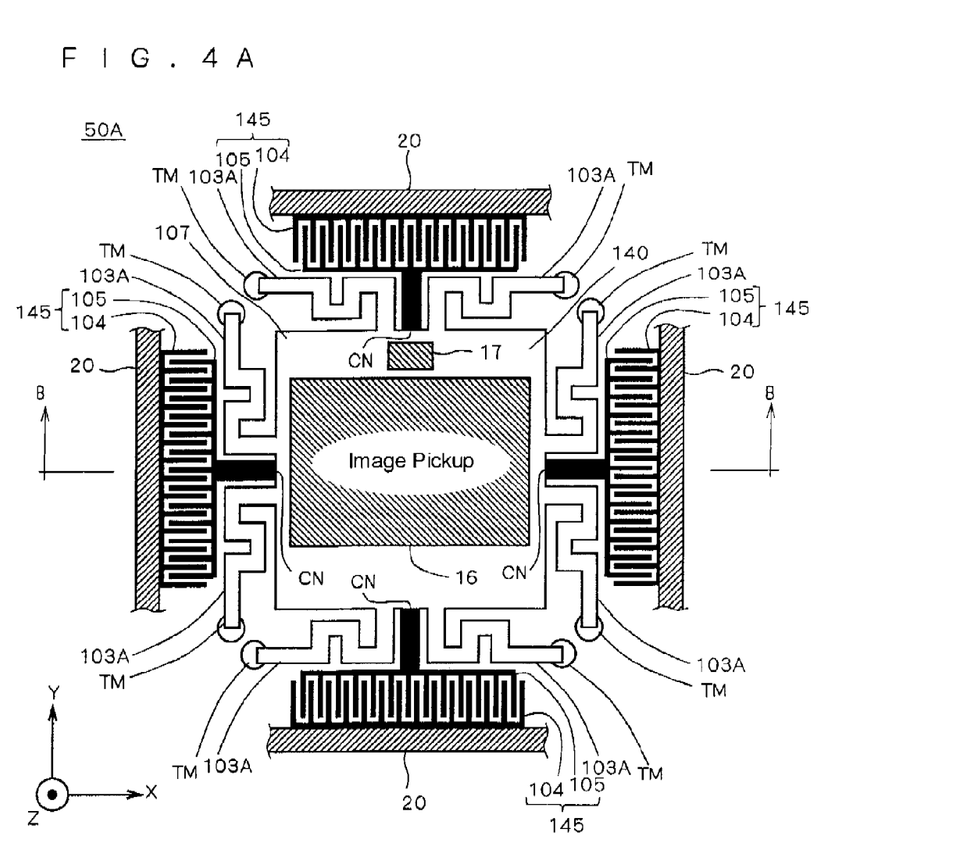
FIGS. 4A and 4B are schematic views showing the configuration of a sensor as a modification.
Figure 4B:
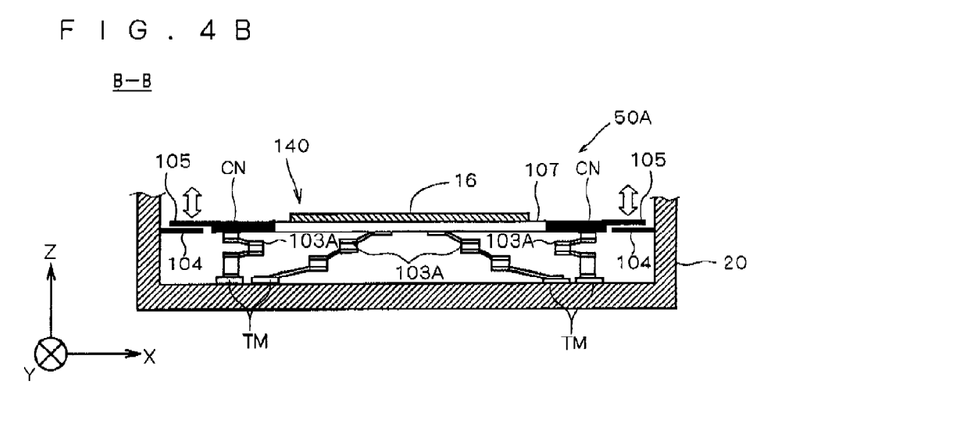

FIGS. 4A and 4B are schematic drawings showing main components of a sensor device 50A obtained by replacing the beam structures 103 in the sensor device 50 illustrated in FIGS. 2A and 2B with beam structures 103A having another shape. Like FIG. 2A, FIG. 4A is a front schematic view of the main components of the sensor device 50A seen from the front side (+Z direction) of the image pickup device 16. Like FIG. 2B, FIG. 4B is a schematic cross section view taken along line B-B of FIG. 4A. In a manner similar to the foregoing embodiment, wires for electrically connecting the components such as the image pickup device 16 and the position sensor 17 with the controller 5 are installed along the extension direction on the beam structures 103A. However, to prevent complication of the drawings, the wires are not shown in FIGS. 4A and 4B.

As shown in FIGS. 4A and 4B, the beam structures 103A extend from a center portion of each of the sides of the movable substrate 107 to the support member TM of the fixed unit 20. More specifically, two beam structures 103A are fixed to each of the sides of the movable substrate 107 so as to sandwich the coupling part CN, thereby supporting the movable unit 140 by total eight beam structures 103A.

The beam structure 103A has a thin, band-shaped, and zigzag shape similar to that of the beam structure 103 in the foregoing embodiment although the zigzag form is different. Since the beam structure 103A extends in the zigzag manner, the extension distance of the beam structure 103A is a few times as long as the distance between the movable unit 140 and the fixed unit 20 like the beam structure 103 in the foregoing embodiment. FIGS. 4A and 4B show an example that the extension distance is at least three times as long as the distance between the movable unit 140 and the fixed unit 20.

Although the beam structures 103 and 103A have the zigzag form in order to increase the extension distance, the invention is not limited to the form. The long extension distance may be assured by employing, for example, a spiral form, a form of combination of the zigzag and spiral forms, or the like.

In the foregoing embodiment, the driving force is applied from the outside to the movable unit 140 by the electrostatic actuator 145. The invention, however, is not limited to the electrostatic actuator 145. For example, also by employing another actuator such as an actuator using a piezoelectric element (piezoelectric actuator) or an actuator using shape memory alloy (SMA) (SMA actuator), effects similar to those of the foregoing embodiment can be obtained.

Since the piezoelectric actuator and the SMA actuator can be relatively easily manufactured in small size, like the electrostatic actuator 145, they are suitable from the viewpoint of assuring miniaturization of the sensor.

Figure 5A:
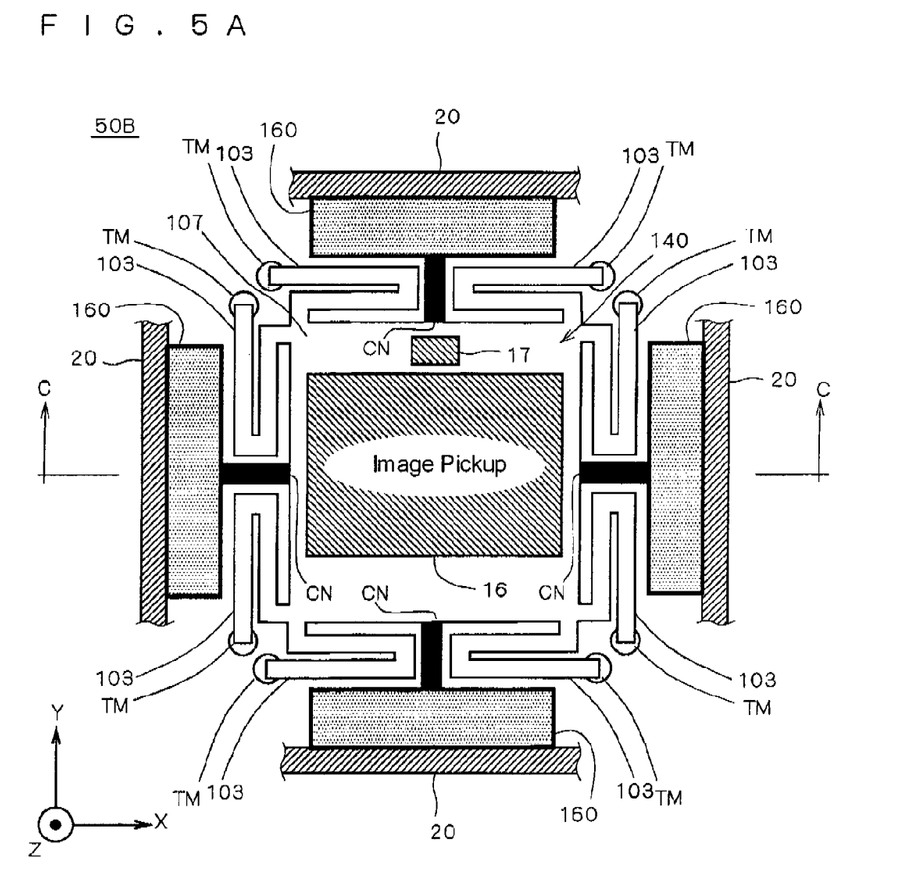
FIGS. 5A and 5B are schematic views showing the configuration of a sensor as a modification.
Figure 5B:
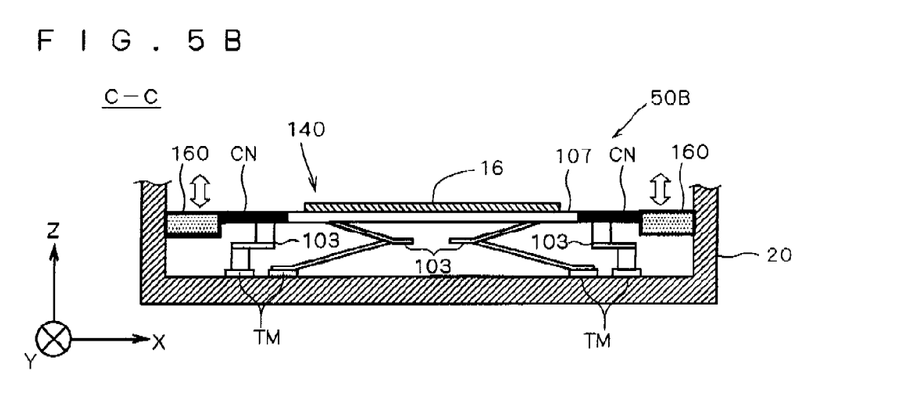

FIGS. 5A and 5B are schematic drawings showing main components of a sensor 50B obtained by replacing the electrostatic actuator 145 in the sensor device 50 illustrated in FIGS. 2A and 2B with an actuator 160 of a solid expandable type (for example, a piezoelectric actuator or SMA actuator). Like FIG. 2A, FIG. 5A is a front schematic view of the main components of the sensor 50B seen from the front side (+Z direction) of the image pickup device 16. Like FIG. 2B, FIG. 5B is a schematic cross section view taken along line C-C of FIG. 5A. In a manner similar to the foregoing embodiment, wires for electrically connecting the components such as the image pickup device 16 and the position sensor 17 with the controller 5 are installed along the extension direction on the beam structures 103. However, to prevent complication of the drawings, the wires are not shown in FIGS. 5A and 5B.

As shown in FIGS. 5A and 5B, the actuator (solid expandable actuator) 160 of the type in which the solid expands and contracts has a rectangular parallelepiped shape. One of the faces is directly or indirectly fixed to the fixed unit 20, and the face opposite to the face fixed to the fixed unit 20 is fixed to the movable unit 140 via the coupling part CN. By expansion/contraction of the solid expandable actuator 160, driving force is applied to the movable unit 140. At this time, the beam structure 103 is deformed, so that the movable unit 140 moves relative to the solid unit 20.

In the foregoing embodiment, when the beam structure 103 is deformed, the movable unit 140 moves relative to the fixed unit 20 at least in a direction almost perpendicular to the front face of a sensor (for example, the image pickup device 16 and the position sensor 17). The invention is not limited to the mode but another mode of the movement of the movable unit 140 relative to the fixed unit 20 may be employed. As another mode of the movement, for example, the movable unit moves relative to the fixed unit along a direction almost parallel with the front face (generally, a predetermined face) of the sensor (for example, the image pickup device 16 and the position sensor 17).

Figure 6A:
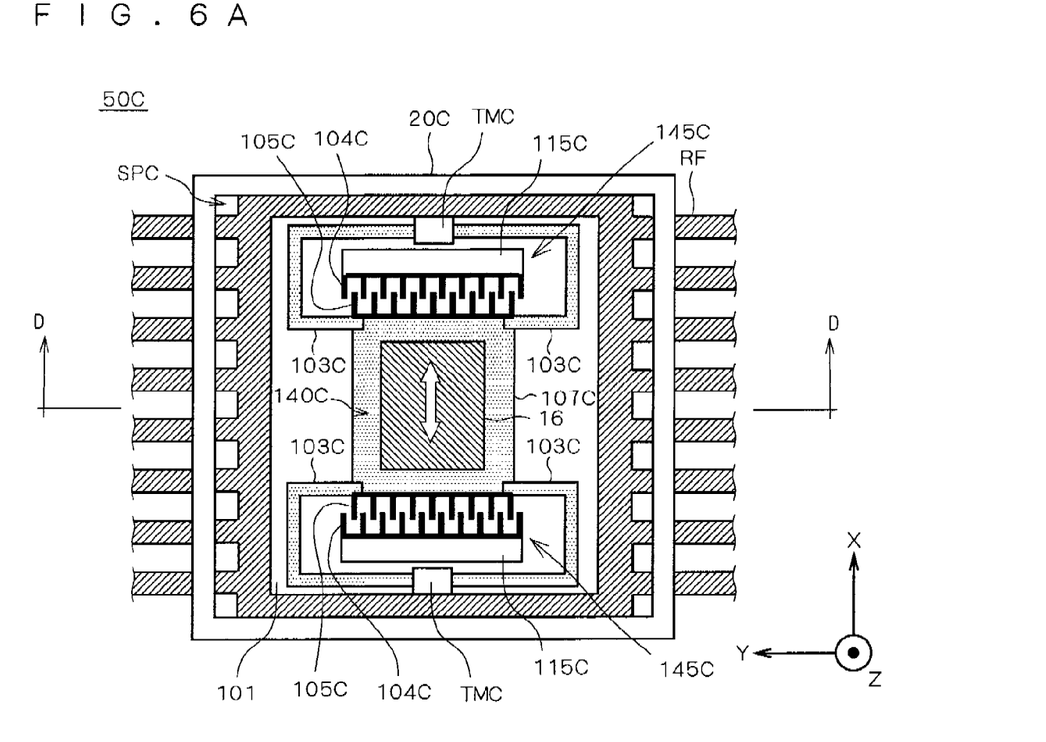
FIGS. 6A and 6B are schematic views showing the configuration of a sensor as a modification.
Figure 6B:
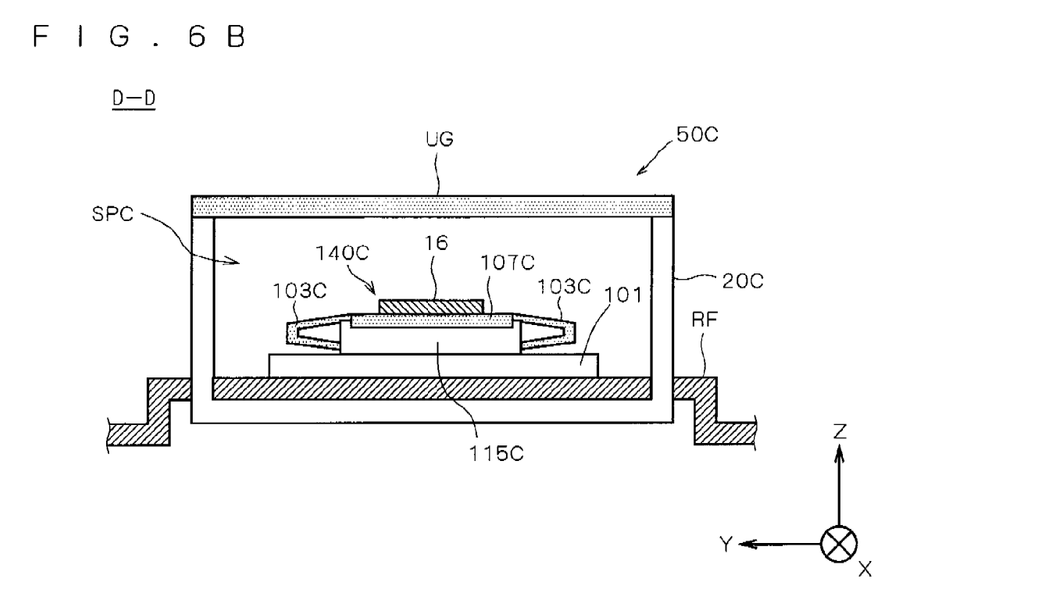
Figure 7A:
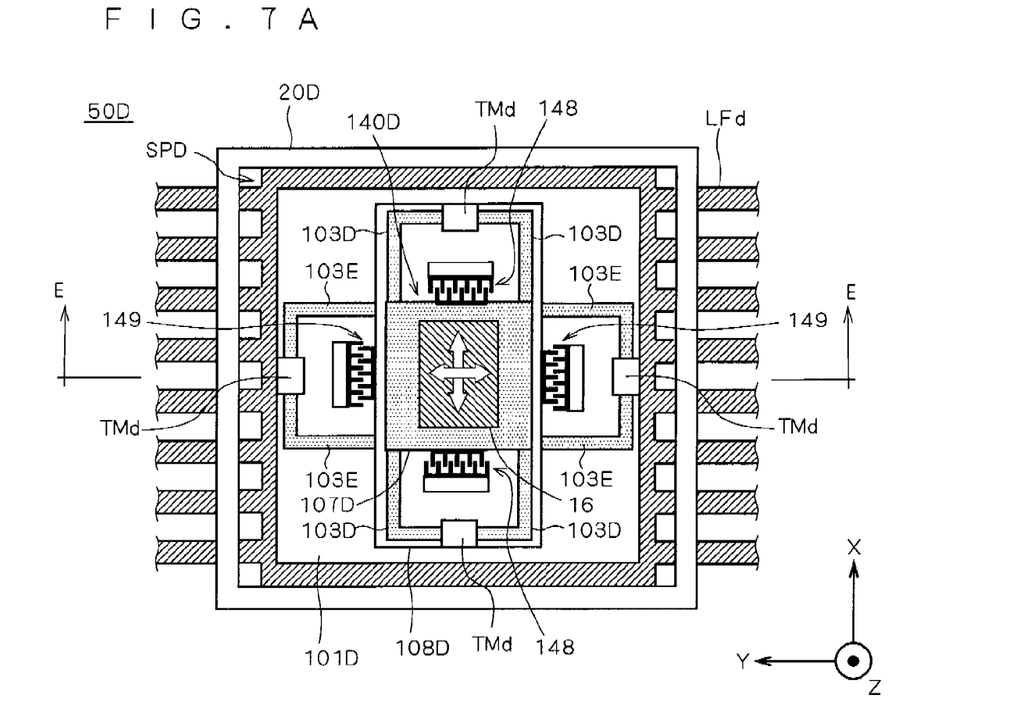
FIGS. 7A and 7B are schematic views showing the configuration of a sensor as a modification.
Figure 7B:
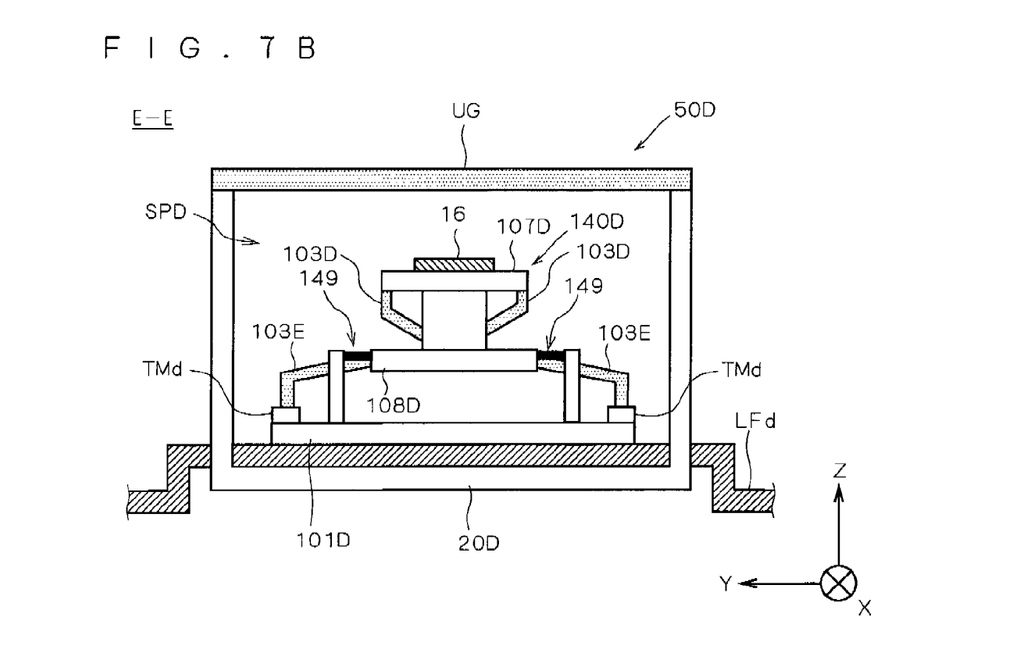

FIGS. 6A and 6B and FIGS. 7A and 7B are drawings showing the configuration of sensors 50C and 50D in which movable units 140C and 140D each provided with the image pickup device 16 move in a direction almost parallel with the front face of the image pickup device 16. FIGS. 6A and 6B show a mode in which the movable unit 140C moves along one direction, and FIGS. 7A and 7B show a mode in which the movable unit 140D moves along two directions almost orthogonal to each other.

First, the sensor 50C shown in FIGS. 6A and 6B will be described.

Like FIG. 2A, FIG. 6A is a front schematic view of the main components of the sensor device 50C seen from the front side (+Z direction) of the image pickup device 16. Like FIG. 2B, FIG. 6B is a schematic cross section view taken along line D-D of FIG. 6A. In a manner similar to the foregoing embodiment, wires for electrically connecting the components such as the image pickup device 16 to the controller 5 are installed along the extension direction on the beam structures 103C. However, to prevent complication of the drawings, the wires are not shown in FIGS. 6A and 6B.

As shown in FIGS. 6A and 6B, the sensor device 50C has an internal space SPC sealed by a fixed unit 20C having a vessel shape whose bottom face is an almost square and a front-face glass plate UG provided on the front side (the +Z direction side) of the image pickup device 16. Main parts of the sensor 50C are disposed in the internal space SPC. The main parts will be described below.

On the bottom face of the internal space SPC, first, a lead frame RF constructed by a part having an almost-rectangular-shaped face and a number of wires penetrating the fixed unit 20C is disposed. On the lead frame RF, a glass substrate (bottom glass substrate) 101 having an almost-rectangular-shaped face is fixed. The movable unit 140C is disposed in a position apart in the +Z direction from the bottom glass substrate 101 by a predetermined distance. The movable unit 140C includes a movable substrate 107C having an almost rectangular shape and the image pickup device 16 formed on the surface in the +Z direction of the movable substrate 107C.

Support members TMC are provided near the edges of a center portion in +X and −X directions on the surface (the face in the +Z direction) of the bottom glass substrate 101. Two band-shaped beam structures 103C extending from each of the support members TMC to two relatively close corner portions out of the four corner portions of the movable substrate 107C are provided. That is, four beam structures 103C are disposed. The beam structure 103C has a zigzag shape different from that of the beam structure 103 in the foregoing embodiment but has material, thickness, and width similar to those of the beam structure 103. The beam structure 103C functions as a member supporting the movable unit 140C having flexibility.

In the +X and −X directions of the movable substrate 107C, electrostatic actuators 145C are provided. The electrostatic actuator 145C has, mainly, a fixed comb structure 104C and a movable comb structure 105C.

The movable comb structures 105C are constructed by a number of projections extended in X-axis directions at the edges in the +X and −X directions of the movable substrate 107. The fixed comb structures 104C are constructed by a number of projections extended in the X-axis directions in the surfaces facing the movable unit 140C, of rectangular-parallelepiped-shaped parts 115C disposed so as to sandwich the movable unit 140C from the +X and −X directions and fixed on the bottom glass substrate 101. The projections of the movable comb structure 105C are disposed so as to slightly enter spaces between the number of projections of the fixed comb structure 104C. In the initial state, the fixed comb structure 104C and the movable comb structure 105C are disposed so as to be apart from each other only by predetermined distance.

The electrode of the movable comb structure 105C is connected to a ground electrode (GND) via the wire installed on the beam structure 103C.

When positive potential is applied to the fixed comb structure 104C on the +X side, attracting forces are generated by electrostatic forces between the fixed comb structure 104C on the +X side and the movable comb structure 105C on the +X side. At this time, the movable comb structure 105C on the +X side is attracted in the +X direction, and the movable substrate 107C on which the movable comb structure 105C is fixed moves in the +X direction. The four beam structures 103C are properly deformed and the movable unit 140C moves in the +X direction relative to the fixed unit 20C. When application of the potential to the fixed comb structure 104C on the +X side is stopped, the movable unit 140C together with the movable substrate 107C returns to the original initial position by restoring force (elastic force) of the beam structure 103C.

On the other hand, when positive potential is applied to the fixed comb structure 104C on the −X side, attracting forces are generated by electrostatic forces between the fixed comb structure 104C on the −X side and the movable comb structure 105C on the −X side. At this time, the movable comb structure 105C on the −X side is attracted in the −X direction, and the movable substrate 107C on which the movable comb structure 105C is fixed moves in the −X direction. The four beam structures 103C are properly deformed and the movable unit 140C moves in the −X direction relative to the fixed unit 20C. When application of the potential to the fixed comb structure 104C on the −X side is stopped, the movable unit 140C together with the movable substrate 107C returns to the original initial position by restoring force (elastic force) of the beam structure 103C.

Therefore, a handshake correcting apparatus having the sensor 50C can correct image blurring (deterioration in a captured image) by applying potential (that is, voltage) in a direction of moving the movable substrate 107C. When application of the voltage is stopped, the movable substrate 107C returns to the initial position by the restoring force generated by the elastic force of the beam structure 103C.

The sensor 50D shown in FIGS. 7A and 7B will now be described.

Like FIG. 2A, FIG. 7A is a front schematic view of the main components of the sensor device 50D seen from the front side (+Z direction) of the image pickup device 16. Like FIG. 2B, FIG. 7B is a schematic cross section view taken along line E-E of FIG. 7A. In a manner similar to the foregoing embodiment, wires for electrically connecting the components such as the image pickup device 16 to the controller 5 are installed on beam structures 103D and 103E. However, to prevent complication of the drawings, the wires are not shown in FIGS. 7A and 7B.

In the sensor device 50D shown in FIGS. 7A and 7B, two configurations for moving a movable unit in one and another direction are provided in a stacked manner like a two-story building. More specifically, the sensor device 50D is provided with a configuration of moving a movable unit 140D in which the image pickup device 16 is provided on the surface in the +Z direction relative to a fixed unit 20D in one direction (X-axis direction) and a configuration of moving the movable unit 140D relative to the fixed unit 20D in a direction (Y-axis direction) almost perpendicular to the one direction. A concrete configuration will be described below.

As shown in FIGS. 7A and 7B, the sensor device 50D has an internal space SPD sealed by the fixed unit 20D having a vessel shape whose bottom face is an almost square and a front-face glass plate UG provided on the front side (the +Z direction side) of the image pickup device 16. Main parts of the sensor device 50D are disposed in the internal space SPC. The main parts will be described below.

On the bottom face of the internal space SPD, first, a lead frame RFd constructed by a part having an almost-rectangular-shaped face and a number of wires penetrating the fixed unit 20D is disposed. On the lead frame RFd, a glass substrate (bottom glass substrate) 101D having an almost-rectangular-shaped face is fixed. A first movable substrate 108D whose surface having a long side in the X-axis direction has a rectangular shape is disposed in a position apart in the +Z direction from the bottom glass substrate 101D by a first predetermined distance. Further, a second movable substrate 107D having an almost square surface is disposed in a position apart in the +Z direction from the first movable substrate 108D by a second predetermined distance.

The image pickup device 16 is formed on the surface in the +Z direction of the second movable substrate 107D, thereby forming the movable unit 140D.

Support members TMd are provided near the edges of a center portion in the +Y and −Y directions on the surface (the surface in the +Z direction) of the bottom glass substrate 101D. Two band-shaped beam structures 103E extending from each of the support members TMd to the side closest to the first movable substrate 108D are provided.

Each of the two beam structures 103E provided in the +Y and −Y directions is fixed to one or another side of the first movable substrate 108D. Consequently, the two beam structures 103E are fixed in two positions which are apart from each other on one side of the first movable substrate 108D only by some distance. The beam structure 103E has an L shape and is made of a material similar to that of the beam structure 103 in the embodiment. The beam structure 103E functions as a member for supporting the first movable substrate 108D having flexibility.

On the +Y and −Y sides of the first movable substrate 108D, electrostatic actuators 149 are provided. The electrostatic actuator 149 has a movable comb structure fixed to the first movable substrate 108D and a fixed comb structure fixed to a structure having a rectangular parallelepiped shape fixed on the surface in the +Z direction of the bottom glass substrate 101D. Projections of the movable comb structure slightly enter spaces between a number of projections of the fixed comb structure. In the initial state, the fixed comb structure and the movable comb structure are disposed so as to be apart from each other only by a predetermined distance.

Further, the support members TMd are provided around the edges in center portions in the +X and −X directions on the surface (the surface in the +Z direction) of the first movable substrate 108D. Two band-shaped beam structures 103D extending from each of the support members TMd to the closest side in the second movable substrate 107D are provided.

Each of the two beam structures 103D provided in the +X and −X directions is fixed to one or another side of the second movable substrate 107D. Consequently, the two beam structures 103D are fixed in two positions which are apart from each other on one side of the second movable substrate 107D only by some distance. The beam structure 103D has an L shape and is made of a material similar to that of the beam structure 103 in the embodiment. The beam structure 103D has flexibility and functions as a member for supporting the second movable substrate 107D, that is, the movable unit 140D.

On the +X and −X sides of the second movable substrate 107D, electrostatic actuators 148 are provided. Each of the electrostatic actuators 148 has a movable comb structure fixed to the second movable substrate 107D and a fixed comb structure fixed to a structure having a rectangular parallelepiped shape fixed on the surface in the +Z direction of the first movable substrate 108D. Projections of the movable comb structure slightly enter spaces between a number of projections of the fixed comb structure. In the initial state, the fixed comb structure and the movable comb structure are disposed so as to be apart from each other only by a predetermined distance.

In the electrostatic actuators 148 and 149, when ground potential is applied to the fixed comb structure and positive potential is applied to the movable comb structure, the force generated by electrostatic force is generated between the fixed comb structure and the movable comb structure. When the generated force is properly applied as drive force to the first and second movable substrates 107D and 108D, the beam structures 103D and 103E are properly deformed, the first movable substrate 108D moves integrally with the movable unit 140D in the Y-axis direction relative to the fixed unit 20D, and the second movable substrate 107D, that is, the movable unit 140D moves in the X-axis direction relative to the fixed unit 20D.

When application of charges is stopped in the electrostatic actuators 148 and 149, the first and second movable substrates 107D and 108D return to the original initial positions by restoring force (elastic force) of the beam structures 103D and 103E.

With such a configuration, the movable unit 140D can be moved in the X-axis and Y-axis directions relative to the fixed unit 20D. By properly combining the movements along the two axes, the movable unit 140D can be two-dimensionally moved relative to the fixed unit 20D along the plane parallel with a predetermined surface (front surface) of the image pickup device 16.

Although the driving force is applied directly to the movable substrate 107 in the foregoing embodiment, it is also possible to construct a mechanism (displacement enlarging mechanism) by setting a fulcrum by supporting some midpoint of the beam structure 103 by a predetermined member and enlarging a small displacement to a large displacement by using the leverage to drive an object to be moved. As an example, by properly adjusting the thickness of the beam structure or the like, and applying a driving force to a portion near one end of the beam structure, the beam structure is deformed, and a displacement larger than a displacement on the one side occurs on the other end side.

In such a displacement enlarging mechanism, to achieve enlargement of a displacement to some extent, the extension distance of the beam structure has to be long to some extent. Therefore, in the case of moving the movable unit relative to the fixed unit by deformation of the beam structure, the deformation amount of the beam structure can be also dispersed in a wider range. Consequently, durability of the beam structure and the wire can be increased.

In the foregoing embodiment, the sensor device 50 in which the posture of the image pickup device 16 for obtaining an image to be stored is changeable has been described. However, the invention is not limited to the embodiment. For example, a configuration similar to the sensor device 50 may be applied to an auto focus device mounted on an image capturing apparatus.

Figure 8:
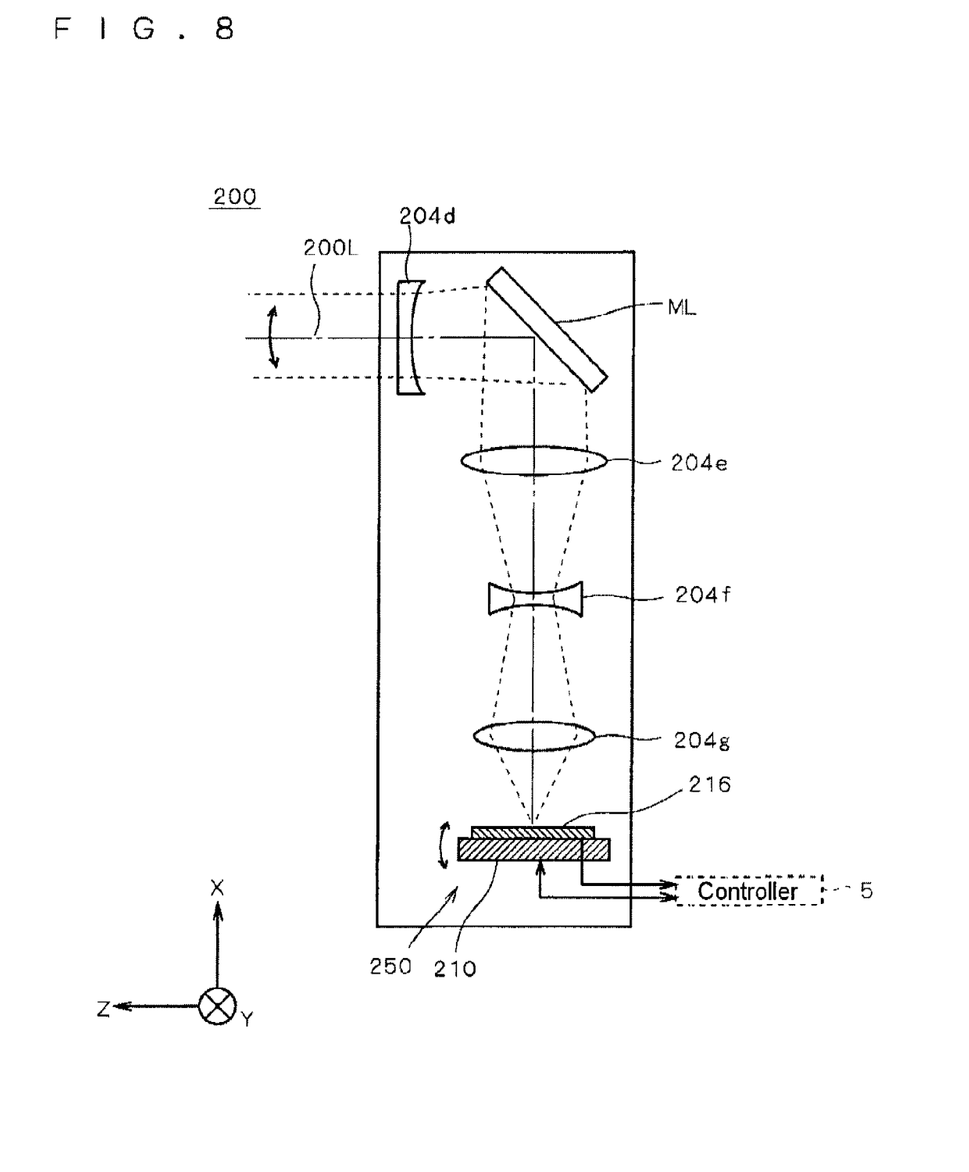
FIG. 8 is a cross section view schematically showing the configuration of an auto-focus device.

FIG. 8 is a cross section view schematically showing the configuration of an auto-focus device 200.

Although not shown, the auto-focus device 200 is attached to, for example, an end of the camera cone 3 of the image capturing apparatus 1 shown in FIG. 1.

The auto-focus device 200 includes a sensor device 250 having an image pickup device 216 constructed by an imaging sensor chip such as a CCD and a driving mechanism 210 for changing the posture of the image pickup device 216, a number of lenses 204d to 204g, and a mirror ML.

The plurality of lenses 204d to 204g guide light from a subject to the image pickup device 216. For example, the lens 204g is driven along an optical axis 200L in a lens position in which a subject image is formed properly in a light reception surface of the image pickup device 216.

By properly driving the lens group 204 on the basis of the position of the lens 204g, the auto-focus control is realized. A pixel signal obtained by the image pickup device 216 is output to the controller 5 and provided for various computations of the auto-focus control.

In the embodiment, the sensor 50 including the image pickup device 16 whose posture can be changed by the driving mechanism 10 has been described. However, the invention is not limited to the embodiment. Also by applying the present invention to any of various sensor devices in which the posture of any of various sensors such as an infrared ray sensor can be changed, effects similar to those of the foregoing embodiment can be obtained. Further, various signals of at least one of various kinds of sensors including the image pickup device 16 and the position sensor 17 may be transmitted via the wires 110.

Although various signals including a read signal such as an image data signal and a drive signal are transmitted via the wires 110 in the foregoing embodiment, the invention is not limited to the embodiment. For example, at least one of a power current, a power voltage, various operation signals according to a user's operation, and various read signals may be transmitted via the wires 110.

In the foregoing embodiment, at least part of the beam structure 103 is made of Si as the same material as the main material of the image pickup device 16 and the position sensor 17 by the MEMS technique. However, the invention is not limited to the material but another same material such as a resin may be used.

Obviously, by properly combining the configuration of the embodiment and various configurations of the modifications without a contradiction, combination of effects of the configurations may be produced.

In the embodiment, the mode of simultaneously forming the movable substrate 107, the beam structure 103, the fixed comb structure 104, and the movable comb structure 105 has been described by, for example, the MEMS technique. In the case where the beam structure 103 and the movable substrate 107 are formed by the MEMS technique, for example, the beam structure 103 and the movable substrate 107 are integrally made of the same material (silicon or the like) and are formed on almost the same plane. For example, some external force has to be applied to the movable substrate 107 so that the beam structure 103 has a zigzag shape like escalator as shown in FIGS. 2B and 3B. Concretely, for example, after the beam structure 103 and the movable substrate 107 are formed on the same plane, it is sufficient to adhere the beam structure 103 to the support member TM and dispose the movable substrate 107 above the fixed unit 20 by using a predetermined retainer (FIGS. 2B and 3B).

By forming the beam structure 103 and the movable substrate 107 with a mold using a resin, the beam structure 103 may have a zigzag shape as shown in FIGS. 2B and 3B without any external force.

While the invention has been shown and described in detail, the foregoing description is in all aspects illustrative and not restrictive. It is therefore understood that numerous modifications and variations can be devised without departing from the scope of the invention.

What is claimed is:

1. An image sensor device comprising:
  a fixed unit;
  a movable unit including an image sensor;
  a beam unit fixed to said fixed unit and movably supporting said movable unit, said beam unit being configured as a spring structure having flexibility;
  a driving unit for applying a driving force for moving said movable unit; and
  a wire unit provided for said beam unit and electrically connecting said image sensor and an external circuit, said wire unit comprising a wire pattern disposed on said beam unit
  wherein said beam unit includes a U-shaped part extending from said movable unit to said fixed unit and having first and second long side parts, said wire pattern being disposed on the surface of said first and second long side parts.

2. The image sensor device according to claim 1, wherein a data signal is transmitted via said wire unit between said image sensor and said external circuit.

3. The image sensor device according to claim 1, wherein at least one of a power current, an operation signal, and a read signal is transmitted via said wire unit between said image sensor and said external circuit.

4. The image sensor device according to claim 1, wherein said driving unit includes an electrostatic actuator.

5. The image sensor device according to claim 1, wherein said driving unit includes a piezoelectric actuator.

6. The image sensor device according to claim 1, wherein said driving unit includes a shape memory alloy.

7. The image sensor device according to claim 1, wherein said beam unit is formed by performing an etching process on a predetermined material.

8. The image sensor device according to claim 1, wherein at least a part of said beam unit is made of the same main material as that of said image sensor.

9. The image sensor device according to claim 8, wherein said same main material includes silicon.

10. The image sensor device according to claim 8, wherein said same main material includes a resin.

11. The image sensor device according to claim 1, wherein said beam unit comprises a displacement enlarging mechanism.

12. The image sensor device according to claim 1, wherein said driving unit moves said movable unit relative to said fixed unit at least along one direction perpendicular to a predetermined surface of said image sensor by deforming said beam unit.

13. The image sensor device according to claim 1, wherein said driving unit moves said movable unit relative to said fixed unit at least along one direction horizontal to a predetermined surface of said image sensor by deforming said beam unit.

14. The image sensor device according to claim 13, wherein said driving unit moves said movable unit relative to said fixed unit along the other direction horizontal to a predetermined surface of said image sensor and orthogonal to said one direction by deforming said beam unit.

15. The image sensor device according to claim 1, wherein said wire pattern is disposed along an extension direction of said beam structure.

16. The image sensor device according to claim 1, wherein said wire pattern and said beam unit are integrally manufactured.

17. The image sensor device according to claim 16, wherein said driving unit includes at least two actuators, each of said actuators having a first portion fixed to said fixed unit and a second portion fixed to said movable unit, and
  said driving unit applies a driving force for moving said movable unit other than via the beam unit.

18. The image sensor device according to claim 17, wherein said movable unit and a portion of said fixed unit are substantially parallel and spaced apart from each other, and one upper extending portion of the U-shaped section of the beam unit is fixed to said portion of said fixed unit and the other upper extending portion of the U-shaped section of the beam unit is fixed to said moveable unit.

19. An image sensor device comprising:
  a fixed unit;
  a movable unit including an image sensor;
  a beam unit fixed at one end thereof to said fixed unit and fixed at an opposing end thereof to said movable unit, said beam unit being configured as a spring structure having flexibility and movably supporting said movable unit; and
  a driving unit for applying a driving force for moving said movable unit other than via the beam unit, said driving unit including at least two actuators, each of said actuators having a first portion fixed to said fixed unit and a second portion fixed to said movable unit;
  wherein said beam unit has a wire unit for electrically connecting said image sensor and an external circuit, wherein said wire unit comprises a wire pattern disposed on said beam unit, and wherein said beam unit includes a U-shaped part extending from said movable unit to said fixed unit and having first and second long side parts, said wire pattern being disposed on the surface of said first and second long side parts.

20. The image sensor device according to claim 19, wherein said wire unit and said beam unit are integrally formed.

21. The image sensor device according to claim 20, wherein said movable unit and a portion of said fixed unit are substantially parallel and spaced apart from each other, and one upper extending portion of the U-shaped section of the beam unit is fixed to said portion of said fixed unit and the other upper extending portion of the U-shaped section of the beam unit is fixed to said moveable unit.

* * * * *